United States Patent [19]
Cho

[11] Patent Number: 5,844,976
[45] Date of Patent: Dec. 1, 1998

[54] MAN-TO-MACHINE COMMUNICATION DURING ON-LINE CONVERSATION IN KEYPHONE SYSTEM

[75] Inventor: Seog-Koo Cho, Daegukwangyeok, Rep. of Korea

[73] Assignee: SamSung Electronics Co., Ltd., Suwon, Rep. of Korea

[21] Appl. No.: 670,693

[22] Filed: Jun. 26, 1996

[30] Foreign Application Priority Data

Jun. 26, 1995 [KR] Rep. of Korea .................. 17611/1995

[51] Int. Cl.⁶ ........................................ H04M 1/00
[52] U.S. Cl. .......................................... 379/157; 379/165
[58] Field of Search .................. 379/67, 88, 90.01, 379/93.01, 93.12, 93.17, 93.32, 102.01, 108.01, 156, 157, 161, 163, 164, 165, 194, 199, 200, 201, 210, 211, 212, 354, 355, 350, 419

[56] References Cited

U.S. PATENT DOCUMENTS

| | | | |
|---|---|---|---|
| 4,570,035 | 2/1986 | Pinede et al. | 379/164 |
| 4,905,274 | 2/1990 | Cooper et al. | 379/157 |
| 5,276,731 | 1/1994 | Arbel et al. | 379/88 |
| 5,404,396 | 4/1995 | Brennan | 379/201 |
| 5,452,347 | 9/1995 | Iglehart et al. | 379/199 |
| 5,461,666 | 10/1995 | McMahan et al. | 379/67 |
| 5,485,505 | 1/1996 | Norman et al. | 379/58 |
| 5,485,511 | 1/1996 | Iglehart et al. | 379/201 |
| 5,524,139 | 6/1996 | Jones | 379/67 |
| 5,615,257 | 3/1997 | Pezzullo et al. | 379/396 |

*Primary Examiner*—Scott L. Weaver
*Attorney, Agent, or Firm*—Robert E. Bushnell, Esq.

[57] ABSTRACT

A method for providing man-to-machine communication during an on-line conversation in a keyphone system is effected by: determining whether man-to-machine mode key data is input from a terminal of a user connected to the keyphone system while the terminal is in an off-hook state and the user of the terminal is engaged in the on-line conversation with a remotely located service center representative. Enabling the man-to-machine communication in order to implement one or more predetermined functions of the terminal in response to input of the man-to-machine mode key data. Receiving instructions from the service center representative as to how to implement the one or more predetermined functions. Providing input of man-to-machine code number data from the terminal based on the instructions to implement the one or more predetermined functions, and terminating the man-to-machine communication when the man-to-machine mode key data is again input from the terminal.

17 Claims, 2 Drawing Sheets

MAN-TO-MACHINE COMMUNICATION DURING ON-LINE CONVERSATION IN KEYPHONE SYSTEM

CLAIM OF PRIORITY

This application makes reference to, incorporates the same herein, and claims all benefits accruing under 35 U.S.C. §119 arising from an application for Man-To-Machine Communication During On-Line Conversation In Keyphone System earlier filed in the Korean Industrial Property Office on 26 Jun., 1995 and there duly assigned Ser. No. 17611/1995.

BACKGROUND OF THE INVENTION

The present invention relates to a method for controlling a keyphone system, and more particularly, to a method for providing man-to-machine communication (hereinafter, "MNMC") during an on-line conversation in a keyphone system.

Generally, a keyphone system (a.k.a., key system) includes a MMC feature that enables a system user to modify system functions. These system functions include, for example, an automatic answering function, a call forwarding function, a time setting function, a home phone number display function, a phone number setting function, and a long distance call limitation function, etc.

A conventional MMC feature for keyphone systems is performed in a manner such that, an MMC mode key on the keypad of a given keyphone terminal is first depressed, and then code numbers corresponding to a predetermined function are input while the keyphone terminal is in an on-hook state. A keyphone user, however, often has difficulty in being able to properly set the various functions, even with the aid of a manual. In these instances, it becomes necessary for the keyphone user to call a service center that provides detailed instructions regarding how particular functions are set.

With the conventional MMC feature described above, however, the predetermined functions can be set only when the keyphone terminal is in an on-hook state. Accordingly, the keyphone user is unable to set functions while simultaneously talking over the telephone line with a service center representative. The present invention is directed towards solving this problem.

SUMMARY OF THE INVENTION

Therefore, it is an object of the present invention to solve the above-mentioned and enable a keyphone user to set keyphone functions while the keyphone terminal is in an off-hook state.

It is another object to provide a method for enabling a keyphone user to set one or more keyphone functions while simultaneously talking on the telephone with a remotely located service center representative.

It is still another object to provide a method for enabling a keyphone user to set predetermined keyphone functions without having to memorize the steps necessary for setting the functions.

It is yet another object to provide a method for enabling a keyphone user to set predetermined keyphone functions without having to refer to a manual.

These and other objects can be achieved in accordance with the principles of the present invention with a method for providing man-to-machine communication during an on-line conversation in a keyphone system. The method contemplates steps of determining whether man-to-machine mode key data is input from a terminal of a user connected to the keyphone system while the terminal is in an off-hook state and the user of the terminal is engaged in the on-line conversation with a remotely located service center representative; enabling the man-to-machine communication in order to implement one or more predetermined functions of the terminal in response to input of the man-to-machine mode key data; receiving instructions from the service center representative as to how to implement the one or more predetermined functions; providing input of man-to-machine code number data from the terminal based on the instructions to implement the one or more predetermined functions; and terminating the man-to-machine communication when the man-to-machine mode key data is again input from the terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
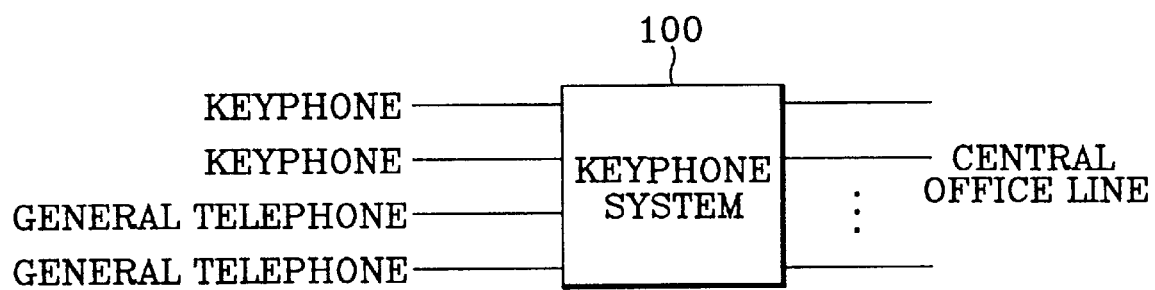
FIG. 1 is a block diagram illustrating the connection state of terminals in a general keyphone system.
Figure 2:
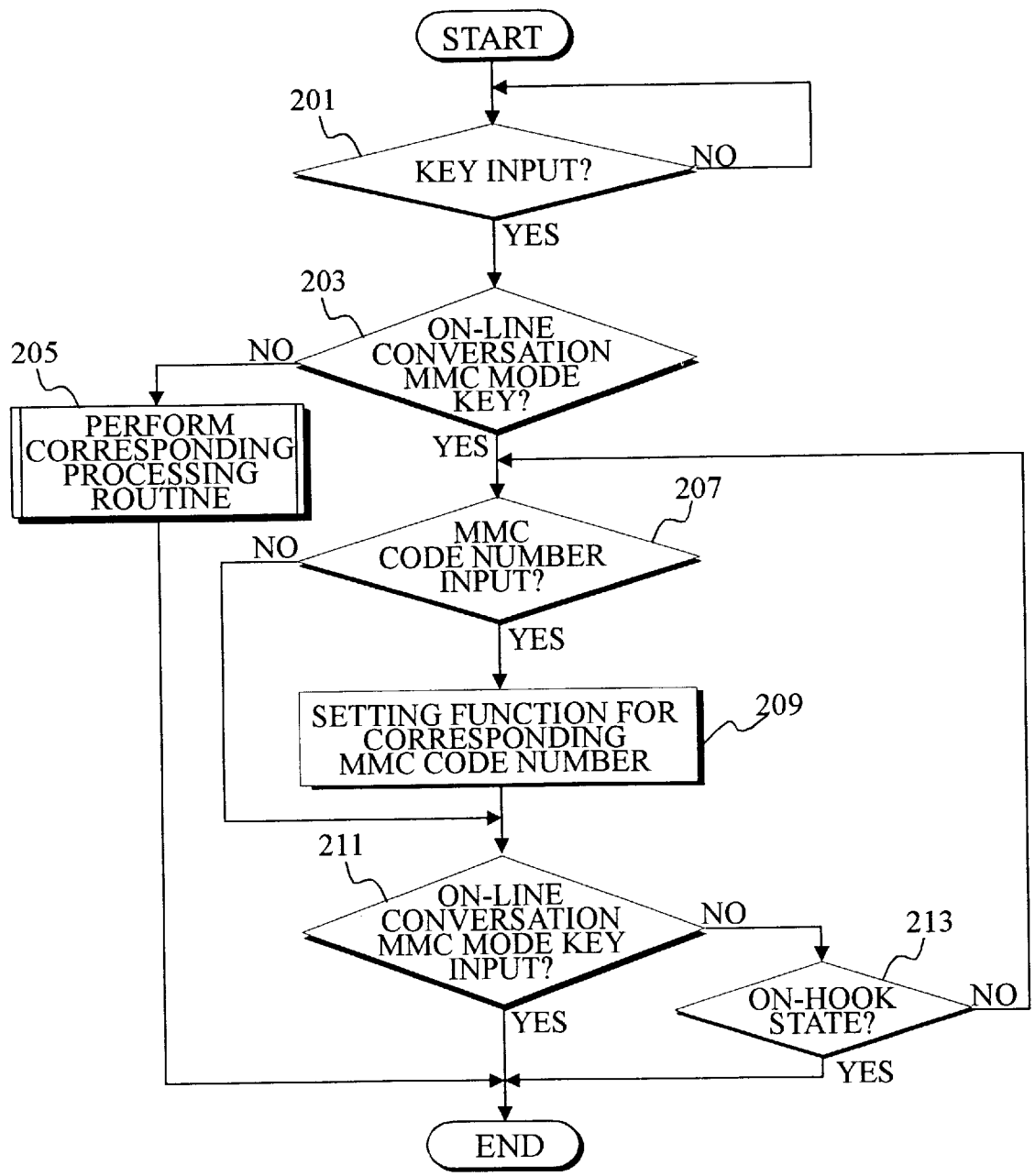
FIG. 2 is a flowchart illustrating the method for providing man-to-machine communication (MMC) during an on-line conversation according to a preferred embodiment of the present invention.

Turning now to the drawings and referring to FIG. 1, a block diagram illustrating the connection state of terminals in a general keyphone system is provided. In FIG. 1, a keyphone system 100 connects keyphone terminals and general telephone terminals to a central office via central office lines. It should be noted that each of the keyphone and general telephone terminals includes a keypad that enables key inputs, and a display unit that provides variable visual displays. Keyphone system 100 is well-known art, and therefore a description of its construction and operation will be omitted in order not to obscure the central scope of the present invention. FIG. 2 is a flowchart illustrating the method for providing man-to-machine communication (MMC) during an on-line conversation according to a preferred embodiment of the present invention.

Refering to FIGS. 1 and 2, a detailed description of the operation of the present invention will now be provided.

While one of the keyphone terminals of FIG. 1 is in an off-hook state, keyphone system 100 detects whether or not a key input is provided from the keyphone terminal, in step 201. This key input may correspond to a dial key input or a function key input. When the key input occurs in step 201, keyphone system 100 determines whether or not the key input corresponds to input of an on-line conversation MMC mode key, in step 203. The on-line conversation MMC mode key is a function key that when depressed, indicates that the keyphone user desires to perform a man-to-machine communication (MMC) operation while engaging in an on-line conversation, presumably with a service center representative that provides detailed instructions regarding how certain keyphone system functions are set. When the key input provided in step 201 does not correspond to input of the on-line conversation MMC mode key, keyphone system 100 performs a processing routine in correspondence with the key input, in step 205. Alternatively, when the key input provided in step 201 corresponds to input of the on-line conversation MMC mode key, keyphone system 100 proceeds to step 207 to determine if an MMC code number is provided through key inputs. When input of the MMC code number is detected in step 207, keyphone system 100 enables setting of a programmed function (e.g., time setting, automatic call answering, call forwarding, home phone number display, phone number setting, long distance call restriction, etc.) of the keyphone system corresponding to the MMC code number, in step 209. When input of the MMC code number is not detected in step 207, or after step 209 is performed, keyphone system 100 determines whether or not the on-line conversation MMC mode key is again input from the keyphone terminal, in step 211. When the on-line conversation MMC mode key is input in step 211, keyphone system 100 completes the on-line conversation MMC mode routine. Alternatively, when input of the on-line conversation MMC mode key is not detected in step 211, keyphone system 100 determines whether the keyphone terminal is in an on-hook state, in step 213. When the on-hook state is not detected, keyphone system 100 returns to step 207, and the keyphone user can input another MMC code number and accordingly set another programmed function of the keyphone system. On the other hand, when the on-hook state is detected in step 213, the routine ends.

For an enhanced understanding of the present invention, the following example will be provided.

When a keyphone user calls a service center to obtain information regarding how a time setting function of the keyphone system may be performed, the service center informs the user of the key operations necessary to execute the time setting function. In other words, if the user presses the on-line conversation MMC mode key of the keyphone while the keyphone is in an off-hook state, a message (e.g., "PROGRAMMING MODE ENTER PGMID:") is displayed on the display unit of the user's keyphone terminal. Then, if key inputs, such as "800", are provided by the user, a message (e.g., "ENABLE TECH. PROG PASSCODE:") is displayed on the display unit. After 4 digits corresponding to a system password are entered, a message (e.g., "ENABLE TECH.PROG DISABLE TENANT: 1") is displayed on the display unit. At this time, if the key corresponding to "1" on the user's keyphone terminal keypad is depressed, a "disabled" state is changed to an "enabled" state. Then, if a key corresponding to "speak" is depressed, a message (e.g., "801: TECH. PASSCODE SELECT PROG.ID") is displayed on the display unit. If the keys corresponding to "505" are pressed, a message (e.g., "OLD: 603133: 1952, NEW: YYMMDDW: HHMM") is displayed on the display unit. In the last exemplary message, "YY" represents the last digits of a year, "MM" represents the two digits of a month, "DD" represents the two digits of the day of the month, "W" represents the day of the week (i.e., 0=Sunday, 1=Monday, . . . , and 6=Saturday), "HH" represents the hour according to a 24 hour system, and "MM" represents the minute. For example, if the keys corresponding to "9603133 1958" are depressed, a message "Mar. 13, 1996, Wednesday, P.M. seven o'clock and fifty-eight minutes" is displayed on the display unit of the user's keyphone terminal. Then, to conclude execution of the time setting function, the on-line conversation MMC mode key is depressed while the keyphone terminal is in the off-hook state, or the keyphone terminal is placed in the on-hook state.

As described above, the present invention provides an advantage of enabling the user to set various MMC functions of the keyphone system by manipulating keys as instructed by the service center while the keyphone terminal is in the off-hook state.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for providing man-to-machine communication in a keyphone system, comprising the steps of:

determining whether man-to-machine mode key data is input from a terminal of a user connected to said keyphone system while said terminal is in an off-hook state and the user of said terminal is engaging in an on-line conversation with a remotely located party;

enabling said man-to-machine communication in order to implement one or more predetermined functions of said terminal in response to input of said man-to-machine mode key data;

providing input of man-to-machine code number data from said terminal to implement said one or more predetermined functions; and terminating said man-to-machine communication when said man-to-machine mode key data is again input from said terminal.

2. The method as claimed in claim 1, wherein said terminal in said off-hook state comprises a keyphone connected to a central office line via the keyphone system.

3. The method as claimed in claim 1, wherein said predetermined functions comprise a time setting function, an automatic call answering function, a call forwarding function, a home phone number display function, a phone number setting function and a long distance call restriction function.

4. The method as claimed in claim 2, wherein said predetermined functions comprise a time setting function, an automatic call answering function, a call forwarding function, a home phone number display function, a phone number setting fiction and a long distance call restriction function.

5. The method as claimed in claim 1, further comprised of alternatively completing said man-to-machine communication when said terminal switches from said off-hook state to an on-hook state.

6. The method as claimed in claim 3, further comprised of alternatively completing said man-to-machine communication when said terminal switches from said off-hook state to an on-hook state.

7. A method for implementing predetermined functions of a terminal of a user connected to a keyphone system, comprising the steps of:

detecting a key input provided from said terminal while said terminal is in an off-hook state and the user of said terminal is engaged in telephonic communication with a remotely located service center representative;

determining whether said key input corresponds to input of man-to-machine mode key data;

enabling implementation of one or more said predetermined functions in response to input of said man-to-machine mode key data;

receiving instructions from said service center representative as to how to implement said one or more predetermined functions;

providing input of man-to-machine code number data from said terminal based on said instructions to implement said one or more predetermined functions; and completing said method when said man-to-machine mode key data is again input from said terminal.

8. The method as claimed in claim 7, wherein said predetermined functions comprise a time setting function, an automatic call answering function, a call forwarding function, a home phone number display function, a phone number setting function and a long distance call restriction function.

9. The method as claimed in claim 7, further comprised of alternatively completing said method when said terminal switches from said off-hook state to an on-hook state.

10. A method for providing man-to-machine communication during an on-line conversation in a keyphone system, comprising the steps of:

determining whether man-to-machine mode key data is input from a terminal of a user connected to said keyphone system while said terminal is in an off-hook state and the user of said terminal is engaged in said on-line conversation with a remotely located service center representative;

enabling said man-to-machine communication in order to implement one or more predetermined functions of said terminal in response to input of said man-to-machine mode key data;

receiving instructions from said service center representative as to how to implement said one or more predetermined functions;

providing input of man-to-machine code number data from said terminal based on said instructions to implement said one or more predetermined functions; and terminating said man-to-machine communication when said man-to-machine mode key data is again input from said terminal.

11. The method as claimed in claim 10, wherein said terminal in said off-hook state comprises a keyphone connected to a central office line via the keyphone system.

12. The method as claimed in claim 10, wherein said predetermined functions comprise a time setting function, an automatic call answering function, a call forwarding function a home phone number display function, a phone number setting function and a long distance call restriction function.

13. The method as claimed in claim 11, wherein said predetermined functions comprise a time setting function, an automatic call answering function, a call forwarding function, a home phone number display function, a phone number setting function and a long distance call restriction function.

14. The method as claimed in claim 10, further comprised of alternatively completing said man-to-machine communication when said terminal switches from said off-hook state to an on-hook state.

15. The method as claimed in claim 13, further comprised of alternatively completing said man-to-machine communication when said terminal switches from said off-hook state to an on-hook state.

16. A keyphone system connected between a terminal and a central office line, said keyphone system enabling implementation of one or more predetermined functions of said terminal by detecting input of man-to-machine mode key data from said terminal while said terminal is in an off-hook state and a user of said terminal is engaged in telephonic communication with a remotely located service center representative via said central office line and the keyphone system, providing the user with instructions from said service center representative as to how to implement said one or more predetermined functions, and detecting input of man-to-machine code number data from said terminal based on said instructions to thereby implement said one or more predetermined functions.

17. The keyphone system as claimed in claim 16, wherein said predetermined functions comprise a time setting function, an automatic call answering function, a call forwarding function, a home phone number display function, a phone number setting function and a long distance call restriction function.

* * * * *